Oct. 5, 1965 A. C. COUTANT 3,209,667
LIGHT REGULATOR FOR TELESCOPES AND PHOTOGRAPHIC
OR CINEMATOGRAPHIC LENSES
Filed Sept. 26, 1961 4 Sheets-Sheet 1

Oct. 5, 1965 A. C. COUTANT 3,209,667
LIGHT REGULATOR FOR TELESCOPES AND PHOTOGRAPHIC
OR CINEMATOGRAPHIC LENSES
Filed Sept. 26, 1961 4 Sheets-Sheet 2

United States Patent Office 3,209,667
Patented Oct. 5, 1965

3,209,667
LIGHT REGULATOR FOR TELESCOPES AND PHOTOGRAPHIC OR CINEMATOGRAPHIC LENSES
André Clément Coutant, 173 Ave. du Roule, Neuilly-sur-Seine, France
Filed Sept. 26, 1961, Ser. No. 140,944
Claims priority, application France, Sept. 29, 1960, 839,844, Patent 1,275,487
2 Claims. (Cl. 95—64)

The light issuing from a camera lens or a sighting telescope cannot be properly utilized by the human eye or a sensitive film unless this light is adequately distributed, that is, subdued to the human eye as well as to the film as a function of the inherent sensitivity of the sensitive receiving organs or surfaces.

Thus, a photographic film cannot be properly exposed unless the light issuing from the camera lens is subdued or controlled as a function of the average sensitivity of this film. Therefore, the light flux issuing for example from the camera lens must necessarily be "metered" or proportioned with a view to obtain a satisfactory film exposure, due account being taken of possible more or less sudden variations in the intensity of the light illuminating the subject, the speed of the film used in the camera, the shutter speed, etc.

In fact, it is known that when a motion picture cameraman takes a movable object and follows it in all directions, the film is exposed compulsorily to zones having very different illumination values so that a quick and permanent modification of the exposure time is necessary in order to preserve a high quality exposure of the sensitive surface and a satisfactory definition throughout the picture.

It has already been proposed, to solve the problem of controlling the light delivered to the sensitive film by providing an operative connection between a photoelectric cell and the lens diaghragm. Although interesting results have been obtained with this method, the latter is attended by certain drawbacks.

Firstly, each lens must be equipped with the coupling device. Then the change in the diaphragm opening or closing direction takes place too slowly. Finally, each diaphragm change is attended by corresponding alterations of the lens characteristics, which is a serious inconvenience both in astronomy and in micro-cinematography.

It is the object of the present invention to avoid these drawbacks by interposing between the camera lens and the sensitive film, or, in the case of a sighting telescope, between the lens and the observer's eye, a device for automatically filtering the light intended for producing an image on a sensitized film or to be received by the observer's eye.

In order to afford a clear understanding of the present invention and of the manner in which the same may be carried out in practice, reference will now be made to the accompanying drawings illustrating diagrammatically a typical embodiment of the device constituting the subject-matter of this invention. In the drawings.

Figure 2:
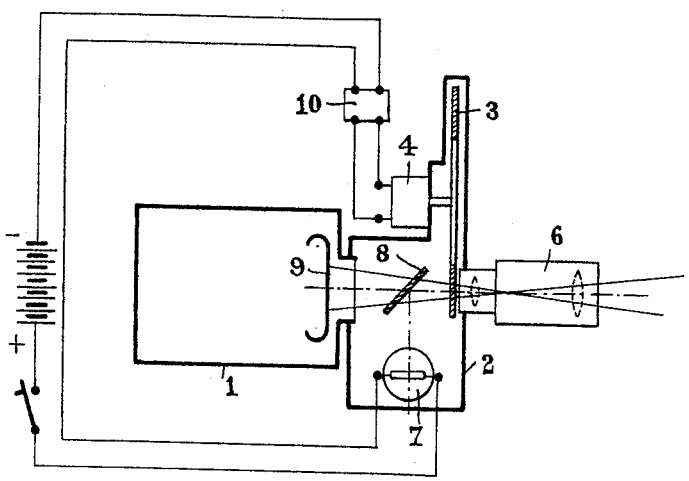
FIGURES 2 to 5 are diagrammatic vertical sections illustrating four apparatus equipped with the filter means of this invention.

The apparatus illustrated in FIG. 2 comprises a casing 2 disposed between the lens 6 and the camera obscura 1; this casing 2 may, if desired, be housed within the camera obscura 1 and has mounted therein the rotary sensitometric strip 3 solid with the output shaft of the reducing gear associated with the motor 4, and aluminum-coated reflector 8 having however an 80-percent transparency and a 45-degree inclination, as shown, and finally a photo-resistant ultra-sensitive cell 7 adapted, when it receives a small percentage of the light beam, to deliver, at the output terminal of a reversing micro-relay 10 a current directed in one or the other direction according as the illumination of the photocell is inferior or superior to the reference value at which it is desired to maintain it. This current issuing from the reversing relay 10 energizes a motor 4 controlling the sensitometric strip 3 in the direction to restore the image illumination to the desired constant value.

Figure 6:
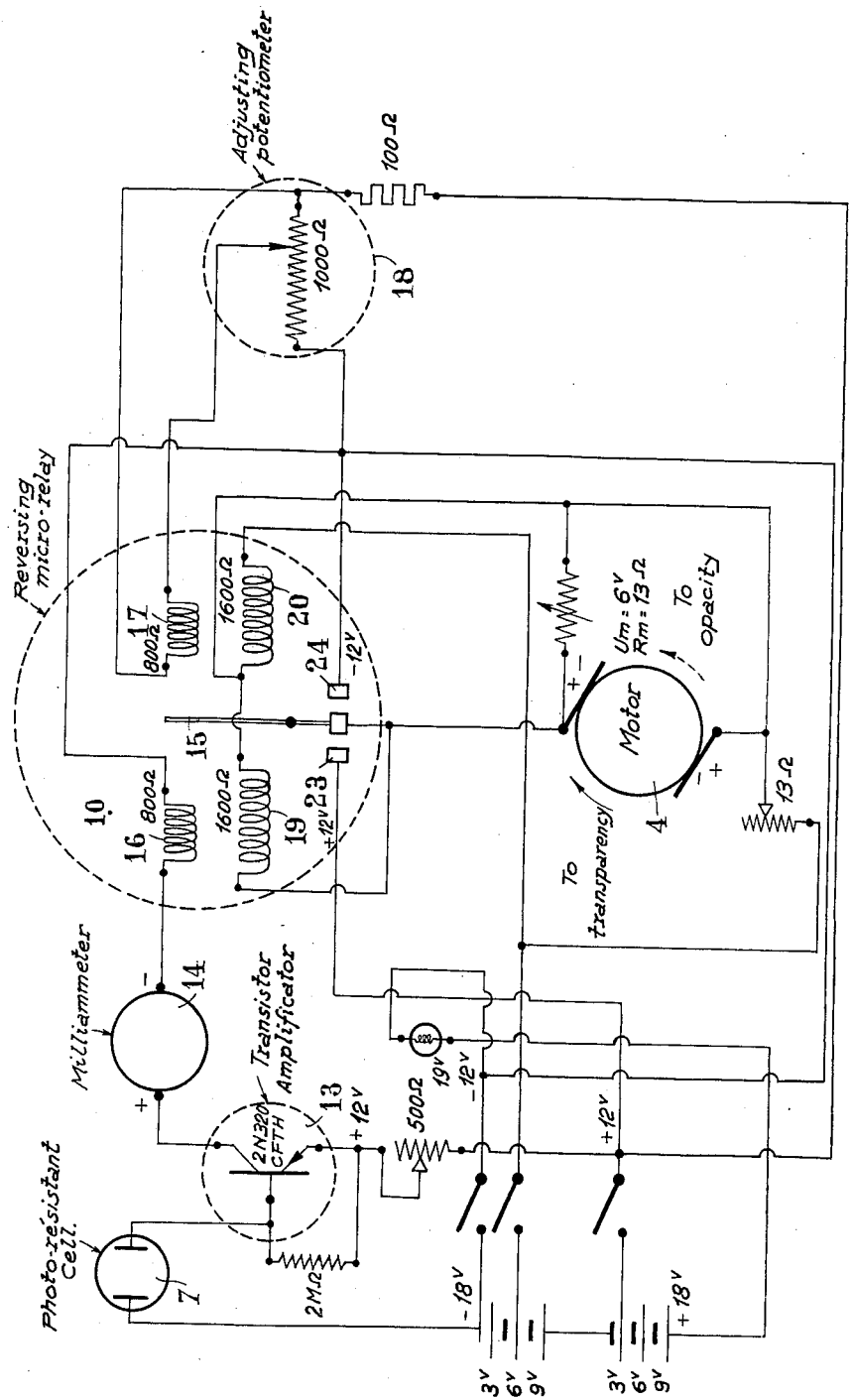
FIGURE 6 is a wiring diagram showing details of the electrical circuit elements.

FIGURE 6 shows a wiring diagram of a mounting adapted to provide the above-defined conditions. In this mounting the electric power is supplied by a set of direct-current generators such as dry batteries and the photocell 7 delivers a modulated current reinforced by means of a transistor amplifier 13 and by a line controlled by a milliammeter 14 through a coil 16 of the reversing micro-relay 10. Registering with coil 16 is another, antagonistic-flux coil 17 receiving therethrough a current adjusted by means of a potentiometer 18 in order exactly to balance the flux of the other coil 16 when the beam striking the cell 7 attains the intensity corresponding to the desired film illumination. Mounted between the pair of coils 16 and 17 is a blade 15 of magnetic metal adapted, in case of unbalance between the two coils 16 and 17, to close one of the pairs of contacts 23 or 24 and thus energize the motor with a current directed in one or the other direction. The complementary coils 19, 20 are mounted in feedback relationship in order to limit the oscillation of the sensitometric strip in case of considerable and rapid luminance variations.

In the above-described electric mounting a galvanometer of the so-called mid-point type may be substituted for the micrometer 4.

Figure 3:
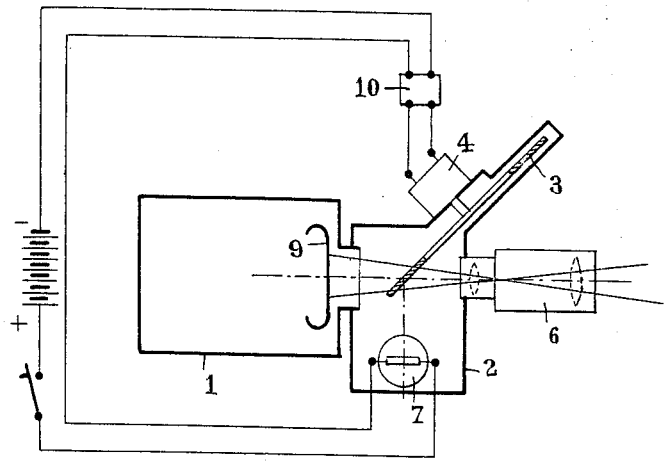

In the alternate embodiment illustrated in FIG. 3 the sensitometric strip 3 itself is aluminum-coated with the proper percentage and inclined at 45°; in this example this rotary strip 3 is substituted for the mirror 8 of FIG. 2.

Figure 4:
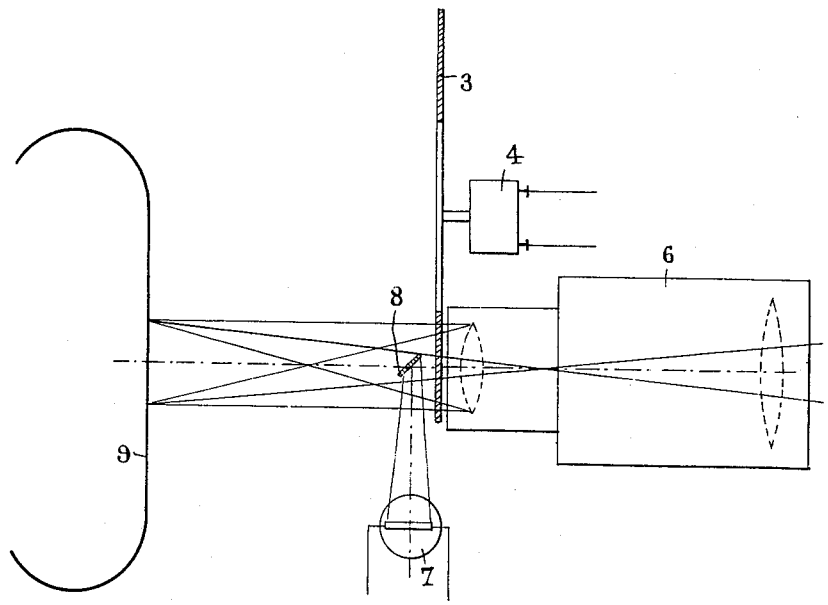

Another embodiment illustrated in FIG. 4 comprises, as a substitute for the semi-transparent mirror 8 of FIG. 2, a tiny-mirror 8 coated to 100-percent with aluminum. This mirror has a very small diameter and is located very close to the rearmost optical element of the lens, thus receiving the complete image of the object and transmitting same to the cell without interfering whatsoever with the image intended for the film proper.

Figure 1:
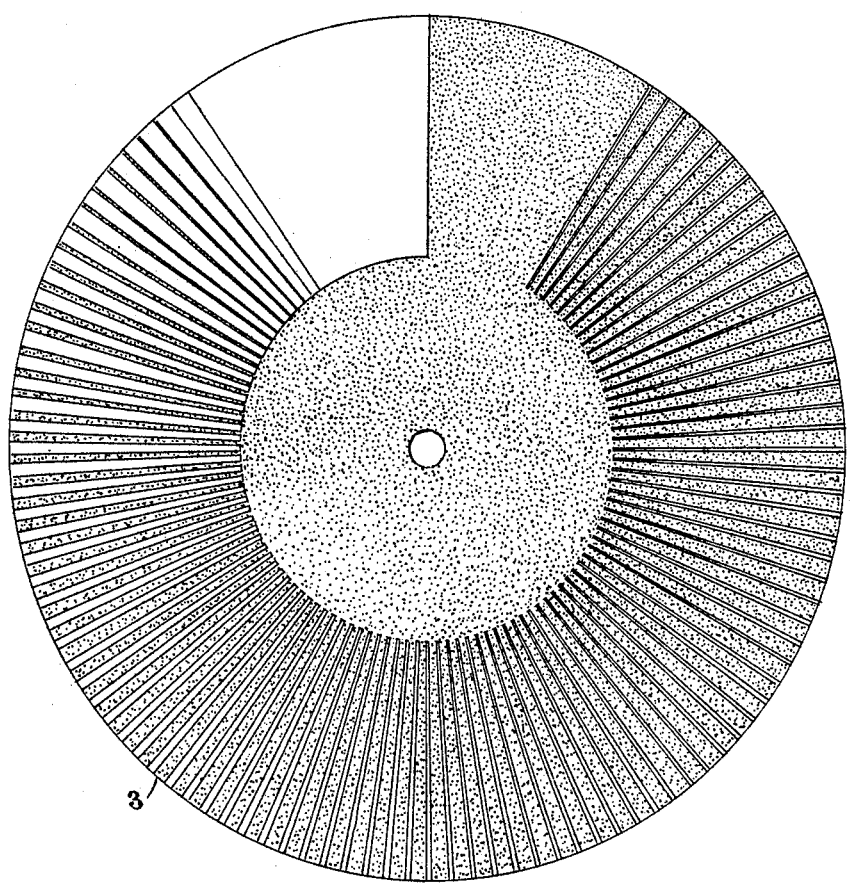
FIGURE 1 is a diagrammatic front view of a rotary sensitometric strip adapted to filter the light beam.

This apparatus operates as follows:

The parallel-faced rotary disc constituting the sensitometric strip 3 of FIG. 1 wherein the transparency varies from complete opacity to complete transparency, receives through it in front of the camera obscura 1 the light beam forming the image on the sensitized film 9. As the light beam passes through the sensitometric disc 3 the cell 7 receives through the intermediary of mirror 8 a too strong or too weak light flux, according to the film sensitivity.

Thus, the reversing microrelay 10 responsive to the cell 7 will switch immediately the motor or galvanometer 4 from forward motion to reverse motion, or vice-versa, as a function of the strength of the current released by the cell proper in proportion to the quantity of light received thereby. As a consequence, the state of equilibrium of the light filtration with respect to the film is obtained instantaneously through the sensitometric strip 3 as a function of the light flux received by the cell 7. In fact, when said cell receives the light beam the equilibrium is given to the motor 4 by the conjugate action of cell 7 and of its reversing relay; consequently, the sensitometric strip 3 acts synchronously with its motor 4 and meters automatically the quantity of light as a function of a predetermined adjustment constituting the cell light metering.

The light, actually intended for the cell, may in fact be filtered specially as a function of the sensitiveness of the film utilized in the camera. A fixed adjustment can be obtained without difficulty by interposing between the mirror 8 and the cell 7 a disc-shaped and vignetted so-called gaging filter, or a conventional vignetted neutral screen (not shown), in order to determine the exact quantity of light necessary for operating the system.

Of course, with this system it is possible, for example by adding colour filters, to change the response curve of the cell as a function of the spectral sensitivity of the film.

Figure 5:
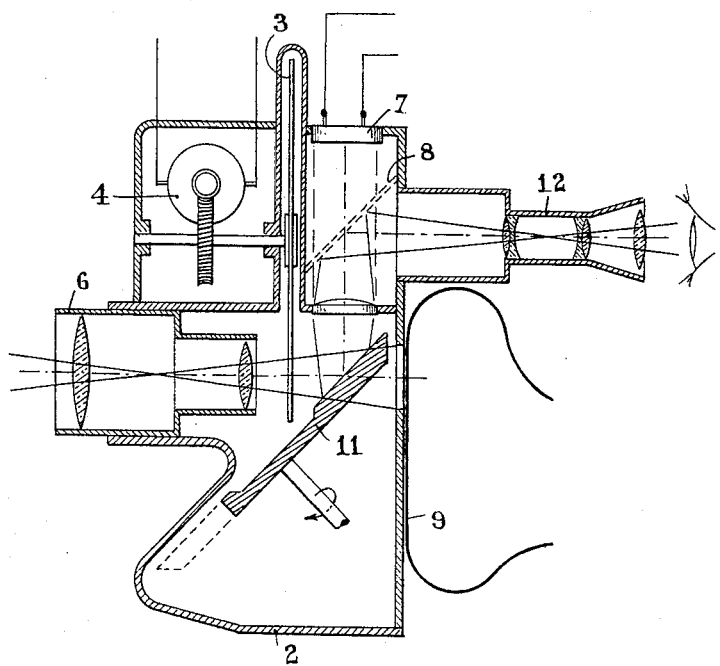

In the alternate embodiment illustrated in FIG. 5 the preceding device is incorporated in the camera proper. The camera is of the reflux type so that the focusing and view-finding operation are effected through the taking lens 6, and it is equipped with the above-described elements, but the semi-transparent cell mirror 8 is located in the vicinity of the rotary reflecting finder 11 acting as the camera shutter before the rectifying lens 12; thus, the light transmitted to the film 9 is not permanently filtered to 20%; the semi-transparent mirror 8 is used to 80% for reflex view-finding purposes; the flux to cell 7 is broken at each picture during the intermittent downward film travel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:
1. A light regulator for optical apparatus comprising a body and a lens system such as an astronomic telescope, a photographic and a cinematographic camera, adapted to be interposed between the body of the apparatus and the lens system, which comprises a rotary disc, consisting of a parallel faced mirror coated with a vignetted filtering layer to have a gradually increasing opacity from one end to the opposite end, said rotary disc being set with a 45° inclination across the light beam issuing from the lens system and having a partially reflecting back face transmitting laterally one fraction of said light beam issuing from the lens system, a photocell receiving an image formed by said fraction of said light beam issuing from the lens system and similar to that formed by the lens system inside the apparatus, an electrical circuit comprising at least one source of direct current, the photoelectric cell being so mounted in said circuit as to deliver a modulated voltage of a value responsive to the candlepower of the image formed on said cell, a micromotor mounted in said circuit for controlling the position of said rotary disc and a micro-relay mounted in said circuit and adapted to co-operate with said photoelectric cell for controlling the energization of said motor, said micro-relay being so adjusted as to maintain the illumination of said image at a reference value corresponding to a reference value of said modulated voltage, said micro-relay being adapted to energize said motor with a direct current so directed as to increase the intensity of the light beam transmitted through said rotary disc when said modulated voltage emitted from said cell is inferior to said reference value, and to decrease the intensity of the light beam transmitted through said rotary disc when said modulated voltage emitted from said cell is superior to said reference value.

2. A light regulator as defined in claim 1 for an optical apparatus having a body and a lens system mounting in front of said body, wherein said light regulator comprises a casing including the rotary disc and the photocell, said casing having at the rear an opening to be mounted on the lens system mounting of the body of the optical apparatus, and another lens system mounting carried in front of said casing to mount the lens system of the optical apparatus.

References Cited by the Examiner

UNITED STATES PATENTS

| | | | |
|---|---|---|---|
| 2,453,693 | 11/48 | Armstrong | 95—64 |
| 2,655,848 | 10/53 | Gray | 95—64 |
| 2,913,969 | 11/59 | Faulhaber | 95—10 |
| 3,017,813 | 1/62 | Greger | 95—10 |
| 3,079,851 | 3/63 | Back | 95—10 |
| 3,106,129 | 10/63 | Frenk et al. | 95—10 |

FOREIGN PATENTS 511,229  8/39  Great Britain.

NORTON ANSHER, *Primary Examiner.*

DELBERT B. LOWE, JOHN M. HORAN, *Examiners.*